United States Patent [19]

Young

[11] 4,269,487
[45] May 26, 1981

[54] SPECTACLE LENS INSERT FOR APHAKIC REFRACTION

[75] Inventor: John M. Young, Southbridge, Mass.

[73] Assignee: American Optical Corporation, Southbridge, Mass.

[21] Appl. No.: 139,369

[22] Filed: Apr. 11, 1980

[51] Int. Cl.³ ............................................. G02C 11/02
[52] U.S. Cl. .................................................... 351/58
[58] Field of Search .................. 351/58, 5, 10, 12, 15, 351/17, 19, 26, 38, 57, 143, 167, 173, 176, 22, 28, 178; 33/200; 2/13; 13/13, 438, 450; 128/76.5

[56] References Cited

U.S. PATENT DOCUMENTS

| 1,551,978 | 9/1925 | Cserep ................................. 351/58 |
| 1,661,967 | 3/1928 | Savoie .................................. 351/58 |
| 2,491,312 | 12/1949 | Henry et al. ......................... 33/200 |
| 4,029,402 | 6/1977 | Noble .................................... 351/58 |
| 4,055,900 | 11/1977 | Grolman et al. .................... 351/5 |

OTHER PUBLICATIONS

Frey, Oct. 1952, Fit-over Trial Frame p. 1501.

Primary Examiner—John K. Corbin
Assistant Examiner—B. W. de los Reyes
Attorney, Agent, or Firm—Alan H. Spencer

[57] ABSTRACT

Over refraction of an aphakic patient with a temporary lens clipped into an empty eye wire of a spectacles frame to be subsequently permanently glazed and worn by the patient. With the temporary lens set at proper vertex distance from the cornea, centered with the eye and correct face fitting adjustment of the frame, over-refraction is undertaken for determination of permanent lens refractive requirements.

4 Claims, 2 Drawing Figures

SPECTACLE LENS INSERT FOR APHAKIC REFRACTION

BACKGROUND OF THE INVENTION

1. Field of the Invention

Apparatus for ocular refraction with particular reference to means for facilitating over-refraction of aphakic patient.

2. Discussion of the Prior Art

Present day over-refraction of aphakic patients using spectacles frames of the brand, size and style intended to be worn requires the provision of kits of several permanently glazed frames of each brand and style. A particular kit representing a single brand and style of spectacles frame may include three or more glazed frames to cover a range of patient pupillary distances of from 60 mm to 68 mm in 2 mm to 4 mm increments.

In addition to the obvious high cost of such refracting equipment and limited selection of frame brand and style afforded the patient, repeated frame adjustment and readjustment for proper face fitting renders this refracting technique tedious, time consuming and difficult, not to mention the lack of accuracy of results attending the not infrequent need to use a glazed frame which does not precisely match the patient's PD.

A further drawback to the use of kits of frames in over-refraction is the short useful life of the frame due to obsolescence of style and/or material fatigue from repeated bending. Repair, storage and maintenance of frame cleanliness for multiple patient use is also problematic.

In view of the foregoing, it is an object of this invention to overcome the drawbacks of prior art over-refracting practices with simple, inexpensive and easily handled test lens means which is adaptable to a wide choice of spectacles frame brands, styles, and sizes.

More particularly, the invention has an objective of considerably minimizing the practioner's capital equipment cost by providing an essentially maintenance free lifetime test lens, i.e. a test lens having an adaptability to old, new and future spectacles frame styles.

A further object is to provide the aphakic with a wide choice of spectacles frames and fitting for over-refraction with the exact spectacles frame selected for ultimate wearing, i.e. to avoid the traditional separate frame fittings for refraction and wearing.

Other objects and advantages of the invention will become apparent from the following description.

SUMMARY OF THE INVENTION

The foregoing and related objects are accomplished by provision of a small diameter cataract test lens, e.g. of +12.00 Diopter sphere power, mounted in a ring. Outwardly spring biased supporting legs, preferably three in number, extend generally radially away from the periphery of the ring for use in detachably fitting the lens in an empty lens rim of a spectacles frame preselected and properly fitted for ultimate patient use. The legs being pivotably adjustable against their biasing permits placement of the test lens in the rim.

With the legs released and seated in the groove of a spectacles rim and the test lens adjusted laterally as needed for proper centering with a patient's pupil, the patient is conventionally over-refracted by forward placement of trial lenses of positive or negative power and/or of proper cylindrical power and cylindrical axis orientation.

Following refraction and removal of the trial lenses, the test lens is released from the spectacles frame for future similar use and a permanent lens is prepared according to the results of the over-refraction. The permanent lens is then mounted in the already patient fitted frame.

The present test lens is adaptable to past, present and future spectacles frame styles and sizes thereby providing the practitioner with a simple and inexpensive lifetime refracting tool.

Details of the invention will become more readily apparent from the following description when taken in conjunction with the accompanying drawings.

IN THE DRAWINGS

DESCRIPTION OF THE PREFERRED EMBODIMENTS

Figure 1:
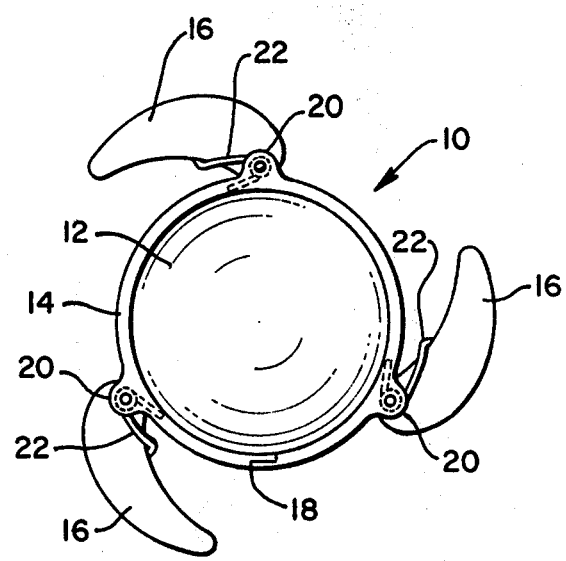
FIG. 1 is an elevational view of a preferred embodiment of the invention.

As illustrated, the test lens insert 10 for aphakic over-refraction includes ophthalmic lens 12 in supporting ring 14 to which mounting legs 16 are pivotally attached.

The edge of lens 12 may be beveled and fitted into a correspondingly shaped inner edge of ring 14 which may be split at 18 for receiving lens 12 and closed with a small optical screw or similar means for retaining lens 12 in place.

Ring 14 and legs 16 may be formed of a suitable metal or plastic. In the latter case, ring 14 need not be split since a lens such as 12 may be inserted into a continuous plastic ring by heating of the ring in the manner regularly practiced for glazing plastic spectacles rims.

Lens 12, which may be formed of glass or a cast or molded plastic such as allyl diglycol carbonate or a polycarbonate, is of a much smaller diameter than any dimension across an empty lens rim of a spectacles frame to be used by the aphakic. A lens 12 diameter of about 15 mm and 20 mm is appropriate.

Legs 16, preferably three in number, are each pivoted to a boss 20 on ring 14 and biased in a direction away from ring 14 by spring 22 in each case. The legs are relatively thin and/or edge beveled for intimate fitting into a spectacles lens rim such as rim 24 of FIG. 2.

Figure 2:
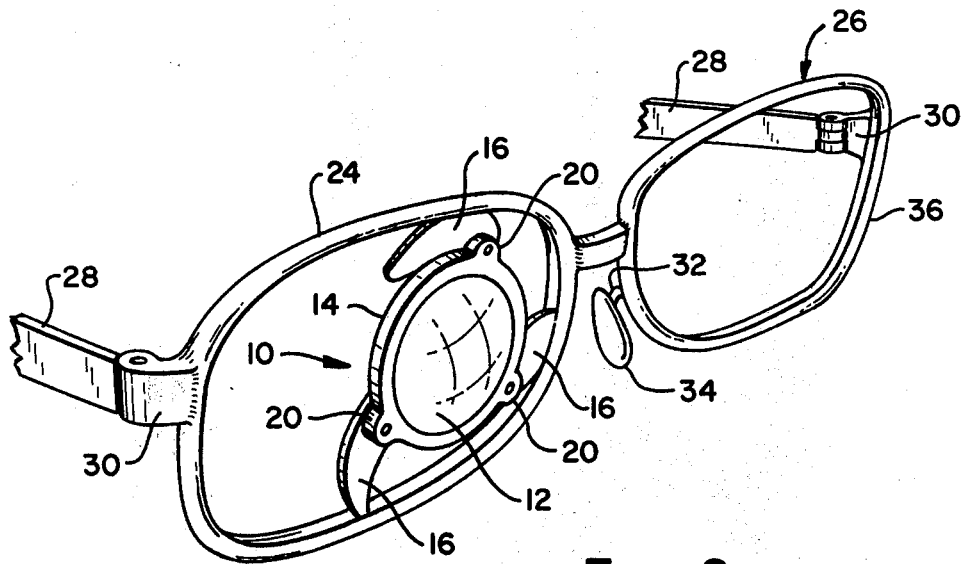
FIG. 2 illustrates the test lens of FIG. 1 in a position of use.

When in the position shown in FIG. 2, insert 10 may be used for aphakic over-refraction as follows:

The spectacles frame 26, having been selected according to style and size desired for a patient's ultimate use, is carefully fitted to the face by the traditional bending of temples 28, endpieces 30 and/or arms 32 of nosepads 34. The latter, in particular, provides means for adjusting vertex distance from the rear surface of lens 12 to the cornea of a patient's eye. The rear of lens 12 is in the position to be occupied by the rear surface of the finished lens intended to replace lens 12 of insert 10.

In the course of the above fitting of frame 26 to the patient's face and/or immediately following same, insert 10 is adjusted in rim 24 to the point where the optical axis (optical center) of lens 12 is aligned with the pupil of the patient's eye.

Upon completion of alignment of insert 10 and fitting of spectacles frame 26 for ultimate wearing, i.e. with proper vertex distance, pantoscopic angle and face fit, one of various forms of well known over-refraction fixtures may be attached to the frame and the whole returned to the patient's face for over-refraction with trial lenses. Examples of useful over-refraction fixtures and procedures may be found in U.S. Pat. Nos. 2,491,312 and 4,055,900 or the device shown and described in the disclosure entitled "Fit-over Trial Frame" published in the American Journal of Ophthalmology Volume 35, Issue 10, page 1501, October 1952. It should be understood, however, that other-refraction techniques and/or equipment may be used in conjunction with insert 10 and that a second insert 10 may be provided in a second lens lens rim 36 of frame 26 for over-refraction of the patient's opposite eye in one application of the frame 26 to the face. The single insert 10 may, of course, be moved to the second lens rim for second eye refraction as an alternative to the use of two inserts 10 in cases where more than one eye of the patient requires aphakic over-refraction.

Once the patient's over-refraction has been completed, simple removal of insert 10 leaves the spectacles frame 26 ready for final glazing and use without need for patient refitting.

The removed insert 10 may be set aside for refracting other patients without undue concern for maintenance of other than ordinary cleanliness. Insert 10 does not make contact with the patient's face as do parts of prior art over-refraction frames.

It should be apparent that there may be various modifications and adaptations of the precise form of the invention here shown that may suit particular requirements and, accordingly, this illustration is not to be interpreted as restrictive of the invention beyond that necessitated by the following claims:

I claim:

1. A lens insert for patient over-refraction with spectacles frames having internally grooved lens receiving rims comprising:

an ophthalmic lens of smaller diametral dimension than a rim of a spectacles frame to be used for over-refraction;

a ring within which said lens is fitted;

a plurality of supporting legs each having one end pivotally connected to said ring and extending away therefrom in a plane generally parallel to the plane of said ring, an edge of each of said legs being beveled for engagement in a selected one of said internal grooves of said rims of said spectacles frame; and means for resiliently biasing each of said legs away from said ring for seating said beveled edges in said groove of said selected rim while permitting lateral adjustment of said lens insert as needed for centering with one of a patient's visual axes.

2. A lens insert according to claim 1 wherein said lens is of strong positive power.

3. A lens insert according to claim 2 wherein said power of said lens is approximately +12 Diopters.

4. A lens insert according to claim 1 wherein said means for biasing said legs is a spring in each case of each leg.

* * * * *